United States Patent [19]

Shinozaki et al.

[11] Patent Number: 4,690,236
[45] Date of Patent: Sep. 1, 1987

[54] MOTORCYCLE LUBRICATION SYSTEM

[75] Inventors: Takashi Shinozaki; Satoshi Ishikawa, both of Saitama, Japan

[73] Assignee: Honda Giken Kogyo Kabushiki Kaisha, Tokyo, Japan

[21] Appl. No.: 536,281

[22] Filed: Sep. 27, 1983

[30] Foreign Application Priority Data

Sep. 29, 1982 [JP] Japan .................. 57-170218
Sep. 29, 1982 [JP] Japan .................. 57-17019

[51] Int. Cl.⁴ .................. F16N 7/14; B62D 21/00
[52] U.S. Cl. .................. 180/219; 123/41.33; 165/42; 180/225; 180/229; 180/311; 184/6.22
[58] Field of Search ........... 180/219, 225, 229, 69.1, 180/68.1, 68.2, 311; 123/196 R, 196 AB, 41.33; 184/6.22, 6.8, 6.6; 165/41, 42, 44, 51

[56] References Cited

U.S. PATENT DOCUMENTS

| | | | |
|---|---|---|---|
| 709,897 | 9/1902 | Goddard | 180/225 |
| 1,015,418 | 1/1912 | Breed | 180/225 |
| 2,781,859 | 2/1957 | Warren | 123/196 AB X |
| 3,945,463 | 3/1976 | Okano et al. | 180/311 X |
| 4,019,595 | 4/1977 | Imai et al. | 180/229 |

FOREIGN PATENT DOCUMENTS

709742  6/1954  United Kingdom ......... 123/196 AB

Primary Examiner—John J. Love
Assistant Examiner—Mitchell J. Hill
Attorney, Agent, or Firm—Lyon & Lyon

[57] ABSTRACT

A frame for a motorcycle having a sealed cavity located within the down tube assembly. The down tube assembly includes two parallel down tubes with two cross members joining same. An inlet and outlet are associated with the cavity thus formed and are placed into communication with the exhaust and intake for lubricant to the engine. Thus, a lubricant supply reservoir is formed. A breather port is also included with the down tube assembly for exhausting gases from the lubricant reservoir. Additional frame construction is disclosed including frame joints, a rear carrier, a rear fender assembly and cross members therefor.

1 Claim, 17 Drawing Figures fig. 1.

MOTORCYCLE LUBRICATION SYSTEM

BACKGROUND OF THE INVENTION

The field of the present invention is motorcycle structures and assemblies, including the frames therefor and lubricant supply systems.

Lubricant systems for internal combustion engines typically include a storage area for the lubricant or oil used to lubricate the moving parts thereof. It is common that the storage or reservoir is located as part of the crankcase. Alternately, it is also common to employ a separate tank for the lubricant storage.

Looking particularly at motorcycles, lubricant storage as part of the crankcase often adds unwanted height or other dimension to the engine and drive train assembly. However, a separate tank also provides space problems. Motorcycles are designed to be as compact and structurally efficient as possible. Such vehicles often have little additional space for added components. The addition of a separate reservoir tank to maintain an adequate supply of lubricant for the engine adds additional complication to the compact, efficient design of a motorcycle.

With more modern high speed engines, lubricant heating due to friction and flow resistance within the engine as well as the normal combustion heating can necessitate, in some designs, a lubricant cooling system. Minimal cooling is available to designs employing the crankcase as a reservoir. Generally, oil radiators may be employed to cool the lubricant from a crankcase sump. When a separate reservoir tank is employed, some additional cooling may be available. Location of the tank can avoid problems of additional heating of the lubricant by the engine and the like.

SUMMARY OF THE INVENTION

The present invention pertains to a frame structure for a motorcycle designed to incorporate as a part thereof a lubricant reservoir for the motorcycle engine. The employment of the frame structure for the purpose of lubricant storage can substantially reduce design problems in developing a compact and efficient motorcycle. No substantial sump is required in the crankcase adding dimension to the engine and drive train assembly. No tank separate from the engine and separate from the frame need be located in the compact vehicle. Some weight savings may further be realized through such a system and a substantial range of reservoir capacities may be attainable.

According to a first aspect of the present invention, the lubricant reservoir associated with the frame is located in a down tube assembly sealed for this purpose. The down tube assembly may include a lubricant inlet and a lubricant outlet for communicating with the engine. A breather port may also be employed for venting gases from the tank. In a second aspect of the present invention, the down tube assembly is arranged such that the portion incorporating the lubricant reservoir is located in an unobstructed area of the vehicle for receiving air stream flow with the vehicle in motion. To this end, parallel down tubes sealed to form a reservoir are spaced wider than the front fork assembly positioned ahead of the frame.

Accordingly, it is an object of the present invention to provide an improved frame for a motorcycle incorporating a lubricant reservoir. Other and further objects and advantages will appear hereinafter.

DETAILED DESCRIPTION OF THE PREFERRED EMBODIMENTS

Figure 1:
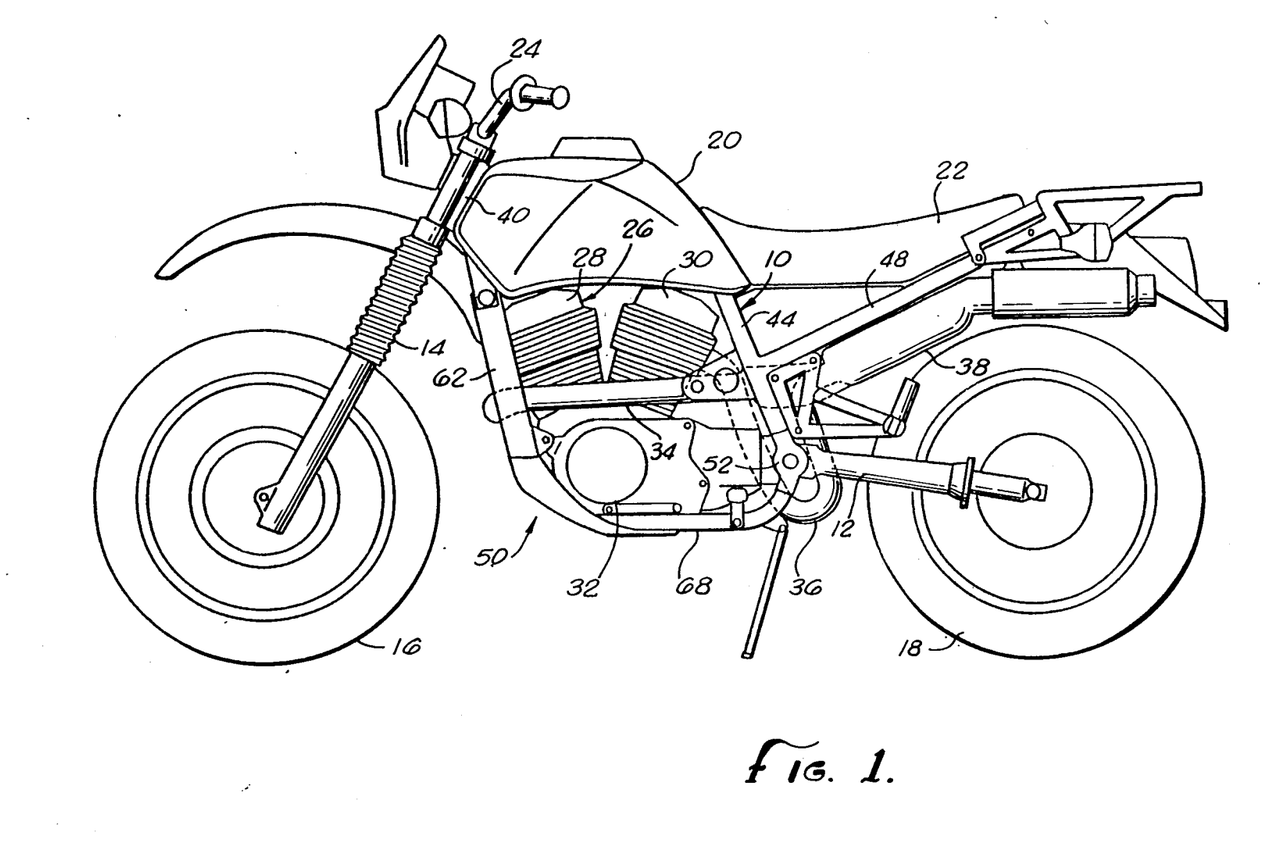
FIG. 1 is a side elevation of a motorcycle incorporating the present invention.

Turning in detail to the drawings and particularly FIG. 1, a motorcycle is illustrated as including a frame 10, a rear suspension 12, a front fork suspension 14, front and rear wheels 16 and 18, respectively, a fuel tank 20 and a seat 22. The front fork suspension 14 is controlled by a steering assembly 24. Supported on the frame 10 is an engine and drive train assembly 26 including a front head 28, a rear head 30 and a crankcase and transmission case 32. Exhaust pipes 34 and 36 lead from the cylinders 28 and 30 to an exhaust muffler system 38 mounted to the frame.

Figure 2:
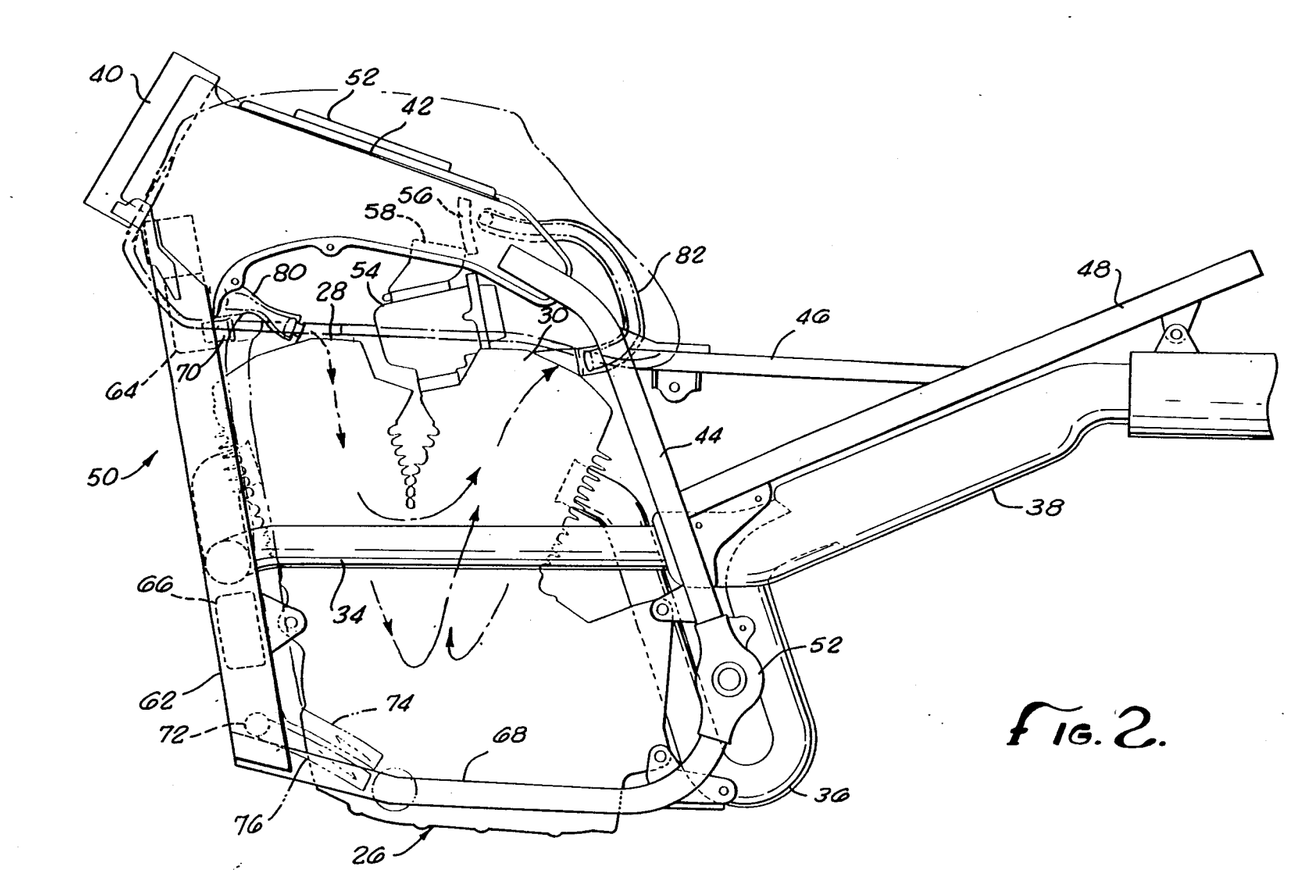
FIG. 2 is a side elevation of a motorcycle of the present invention illustrating in greater detail the frame and engine thereof.

The frame 10, as best seen in FIG. 2 includes a head pipe 40, a main frame 42, center frame members 44, seat rails 46 and rear stays 48. A down tube assembly 50 extends downwardly from the main frame 42 and then rearwardly to meet a rear suspension support bracket 52. The rear suspension support bracket 52 includes a pivot axis to which the rear suspension 12 is mounted and connects the center frame members 44 and the back portion of the down tube assembly 50.

The main frame 42 is generally hollow in construction and may include an air filter assembly 52 through which air is drawn, passing to the carburetors 54. A baffle 56 protects the intake 58 to the carburetors 54 against direct flow from the oil breather tube more fully described below. The main frame 42 may also include members 60 on the side thereof forming channels for directing flow downwardly toward the engine. Spaces between the main frame 42 and the fuel tank 20 provide for additional air flow into the area of the engine.

The down tube assembly 50 is illustrated as including parallel down tubes 62 shown to branch from a common junction with the head pipe 40. The parallel down tube 62 may be of rectangular cross section and of greater size than might otherwise be required simply for structural considerations. Cross members 64 and 66 add additional structure to the frame extending between the parallel down tubes 62. The down tubes 62 are fixed at their upper end to the upper frame 42 in conjunction with fixture of the upper frame 42 with the head pipe 40. The down tube assembly then extends rearwardly to the down tube 62 in an undercarriage structure 68. The undercarriage structure 68 extends to the bracket 52.

The portion of the down tube assembly constituting the down tube 62 and the cross members 64 and 66 are sealed to thereby create a cavity within the down tube assembly 50. The available volume for such a cavity naturally depends on the cross-sectional dimension of the down tube 62 as well as the size of the cross members 64 and 66. For communication with this cavity thus formed, an inlet 70 extends to the upper cross member 64 while an outlet 72 extends from the lower cross member 66. Oil tubes 74 and 76 communicate lubricant from the engine 26 to the cavity formed in the down tube assembly 50.

Oil or lubricant flow through the engine is pressurized to the components and then allowed to fall into the lower portion or crankcase. The oil may then be pumped through a lubricant exhaust to the oil tube 74 where it is conveyed to the reservoir within the down tube assembly 50. Oil may then be drawn through the oil tube 76 into a pump 78 to be repressurized and distributed to the engine. Two pumps may be employed to advantageously pump the exhausted oil to the reservoir and to pressurize the oil from the reservoir to the engine. A tri-sump type pump for scavenging and oil pressurization may be employed. Such a pump may be 1.4 times more efficient than a regular lubricant pump.

Figure 4:
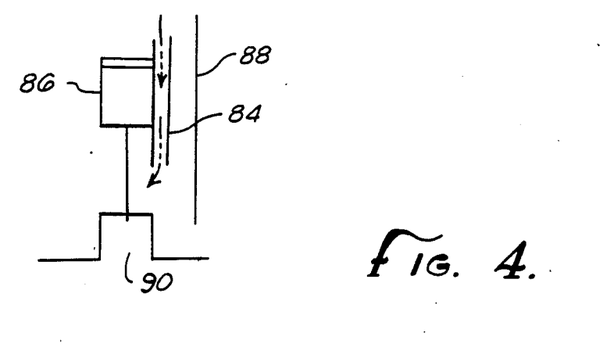
FIG. 4 is a schematic illustration of the flow within the lubricant system of the present invention.
Figure 5:
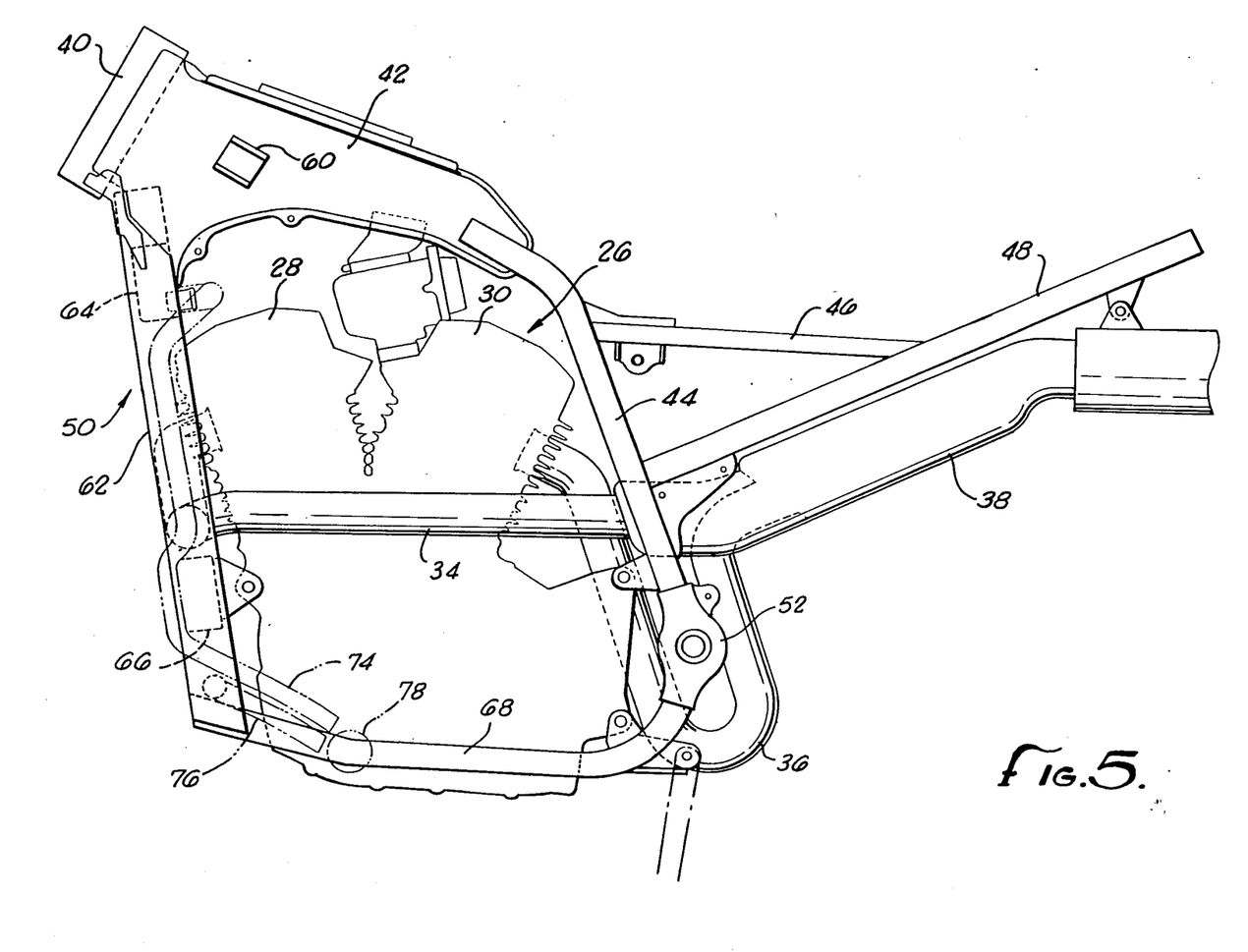
FIG. 5 is a further side elevation of the motorcycle of FIG. 1 illustrating the frame and engine in detail.

To provide a breather system for the lubricant system, a breather port 80 in communication with the cavity within the down tube assembly 50 is also in communication with the head 28 of the motorcycle engine 26. This communication allows evacuation of gases from the cavity of the down tube assembly 50. The gases may flow as can be seen by arrows in FIG. 2 to a breather tube 82 extending into the main frame 42 behind the aforementioned baffle 56. Normal breather operation may also be provided directly from the crankcase and other components of the engine to the breather tube 82. As can be seen in FIG. 4, the breather gases are directed from the cavity of the down tube assembly to the engine head where they are directed through the cylinder wall 84 outside of the piston and cylinder area 86 and inwardly of the timing chain housing 88 to the crank area 90. From the crank area 90, the gases may travel upwardly in a conventional manner to the breather tube 82 and to the area of the air cleaner intake assembly.

Figure 3:
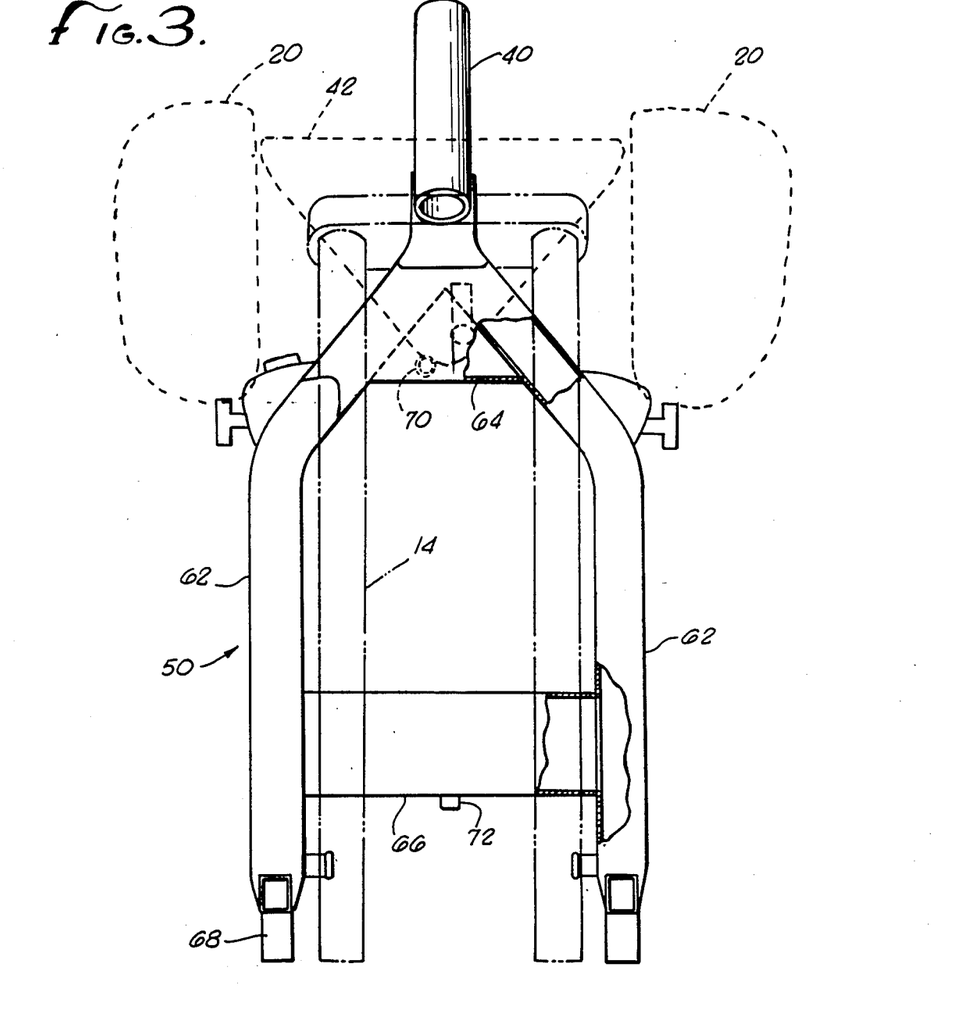
FIG. 3 is a front view of the frame of FIG. 2.

As can best be seen in FIG. 3, the width of the down tube assembly 50 is such that it extends outwardly of the front fork suspension assembly 14. This positioning of the down tubes 62 of the down tube assembly 50 present the down tube 62 into the air stream with the motorcycle moving in a forwardly direction. This flow to the down tube 62 is more undisturbed than that which must pass directly around the front suspension assembly 14 to enhance cooling. The cooling flow against the down tubes 62 results in significant heat transfer, reducing the lubricant temperature.

Figure 6A:
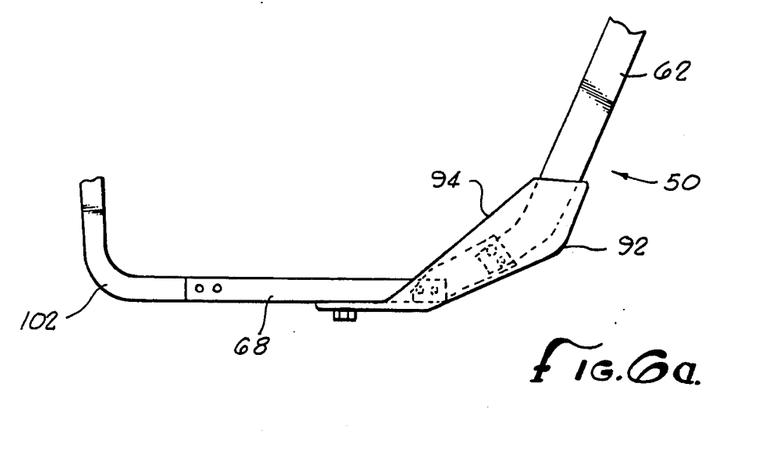
FIG. 6A is a side elevation of an alternate embodiment of the down tube assembly.
Figure 6B:
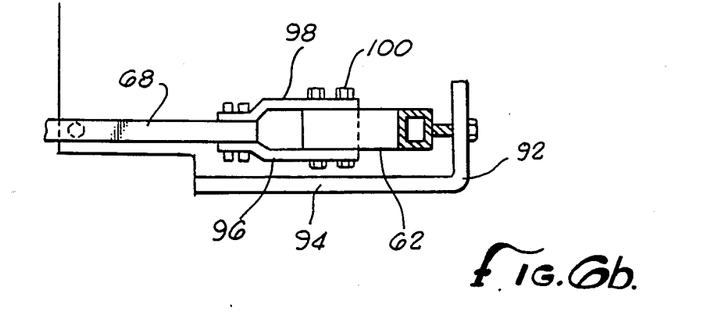
FIG. 6B is a top view of the device of FIG. 6A.
Figure 7:
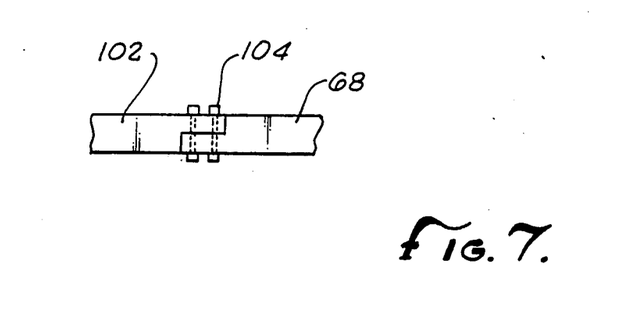
FIG. 7 is a detail view of a joint in the frame.

A specific arrangement for the assembly of the frame components is illustrated in FIGS. 6 and 7. Rather than welding the frame 10, a system may be employed for bolting the components together. This may be of some advantage such that the reservoir system associated with the down tube assembly may be conveniently removed. A cover pan 92 extends beneath the down tube assembly 50 as well as upwardly as a wall 94 to protect the side of the structure. The down tube 62 is illustrated as being bolted to joint plates 96 and 98 by fasteners 100. The joint plates 96 and 98 are also fastened to the undercarriage member 68. Optionally, the undercarriage 68 may terminate at a joint as can best be seen in FIG. 7. In this case, a lower frame member 102 may extend rearwardly and upwardly to the support for the rear suspension system. The lower frame member 102 is conveniently bolted by means of fasteners 104 to the member 68.

Figure 8:
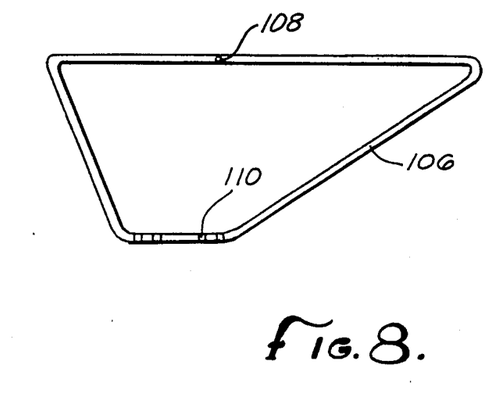
FIG. 8 is an inside side elevation of a side panel for the motorcycle of FIG. 1.
Figure 9:
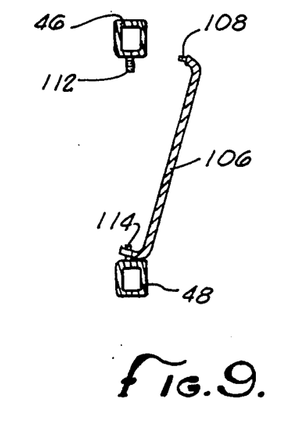
FIG. 9 is a cross-sectional end view illustrating the attachment of the side panel of FIG. 8 to the frame of the motorcycle of FIG. 1.

Looking to other features of the motorcycle of the preferred embodiment, FIG. 8 illustrates a panel which may be associated with the frame 10. The panel 106 includes a pin 108 and holes 110 for fastening. The seat rail 46 includes a receiver 112 for accommodating the pin 108 in fixed position. The back stay 48 includes a mounting pin 114 for receiving the holes 110 of the panel 106. As can be seen in FIG. 9, the holes 110 are positioned over the pin 114 such that the pin 108 can be pushed into position on the receiver 112. In this way, the triangular space defined by the center frame member 44, the seat rail 46 and the back stay 48 on each side of the motorcycle may be enclosed through the use of panels 106.

Figure 10:
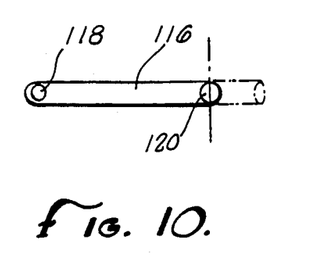
FIG. 10 is a side elevation of the gear changing lever of the motorcycle of FIG. 1.
Figure 11:
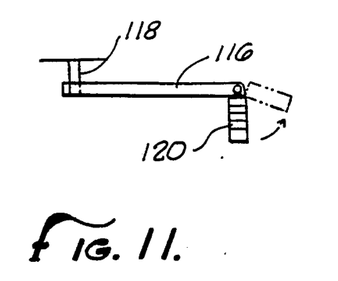
FIG. 11 is a top view of the gear changing lever of FIG. 10.

In FIGS. 10 and 11, a gear change lever assembly is illustrated as including a lever 116 cooperating with the control rod 118 from the transmission. A pedal 120 is pivotally mounted to the lever 116 in such a way that substantial force may allow the pedal to be pivotally forced rearwardly to avoid catching on the terrain. This is a particularly useful feature for dirt bikes.

Figure 12:
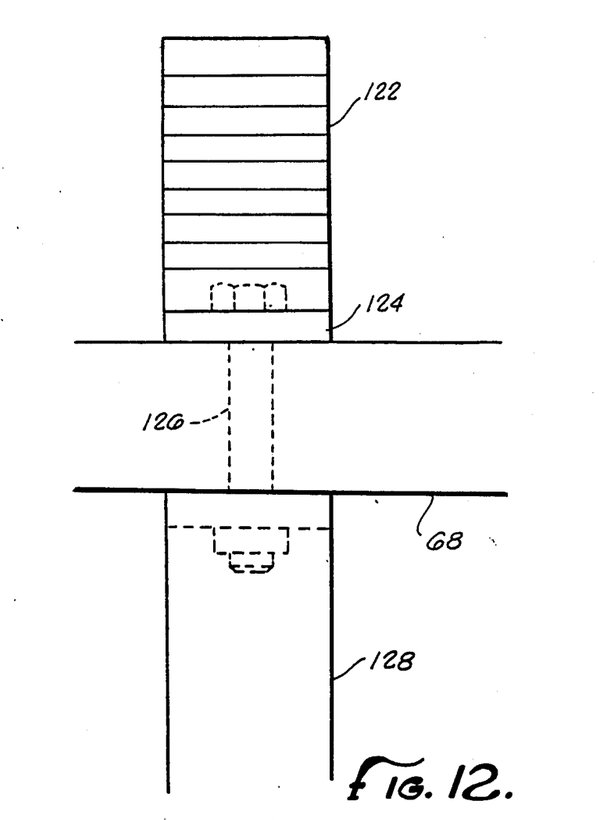
FIG. 12 is a foot pedal for the motorcycle of the present invention illustrated in plan.

FIG. 12 illustrates a step 122 extending from a holder 124 held to the undercarriage element 68. A fastener 126 retains the step 122 as well as being fixed to a cross pipe frame member 128.

Figure 13:
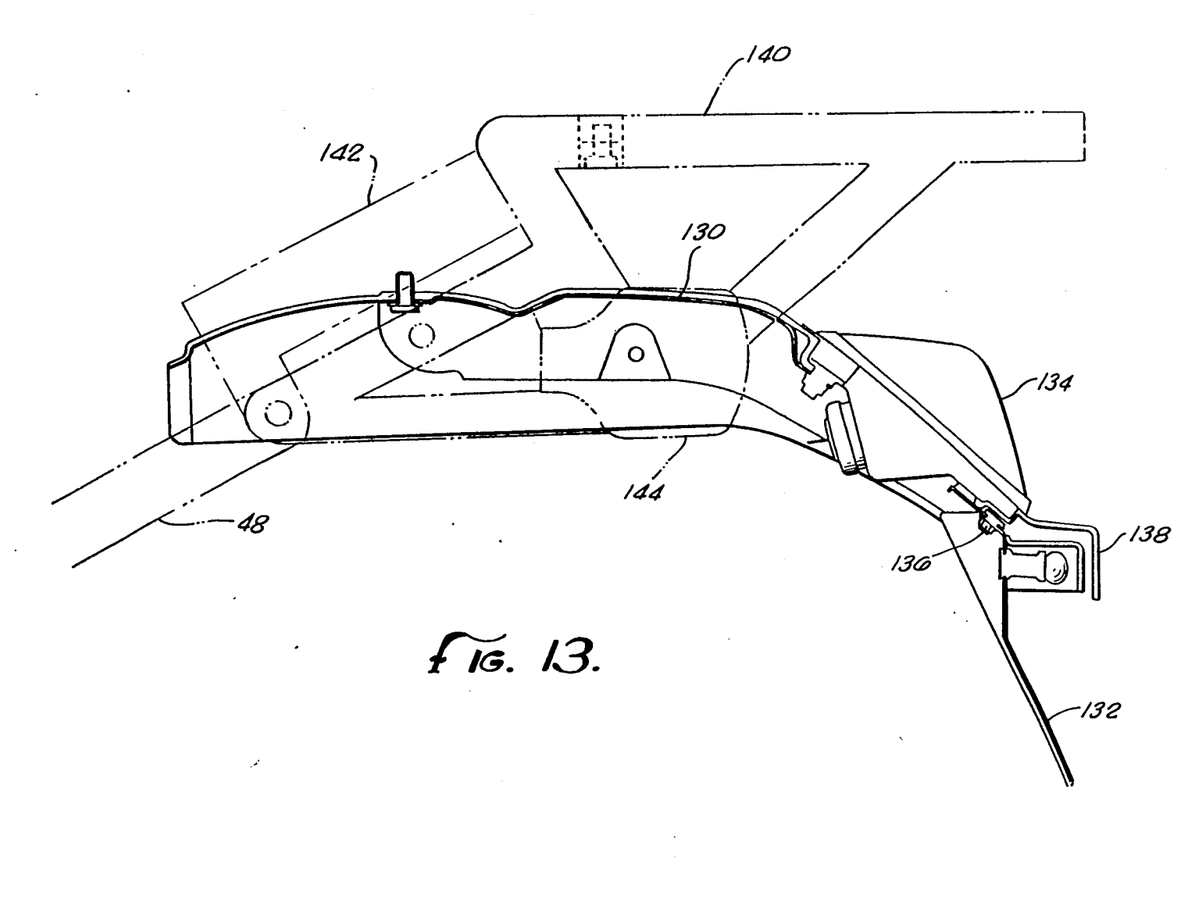
FIG. 13 is a side elevation of the rear frame structure of the motorcycle of FIG. 1.

In FIG. 13, the rear assembly of the motorcycle is illustrated as extending from the back stays 48. A rear fender 130 fixed relative to the back stay 48 extends rearwardly for attachment of the license plate holder 132 beneath a taillight 134 covering a fastener 136 retaining the license plate holder 132 in place. The license plate light 138 is incorporated with the holder 132 as shown. Fixed above the fender assembly 130 and also fixed relative to the back stay 48 is a carrier 140. A grip 142 is also associated with the assembly as are rear turn indicator lights 144.

Figure 14:
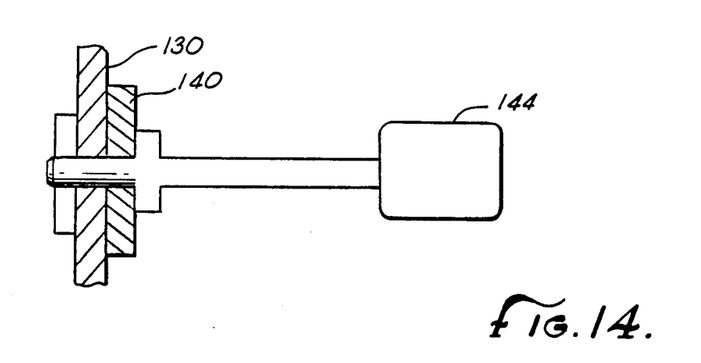
FIG. 14 is a cross-sectional elevation of the rear blinker mounting.

FIG. 14 illustrates the attachment of the turn indicator lights 144 to the carrier 140. The rear fender 130 is also illustrated in association therewith.

Figure 15:
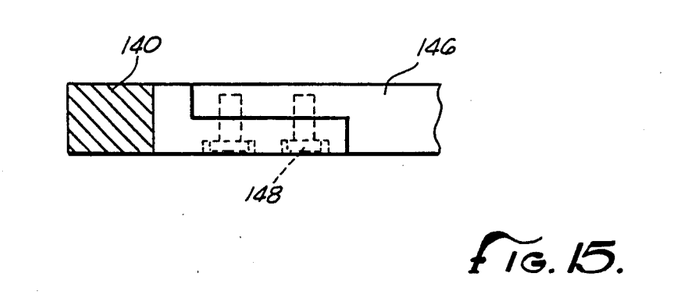
FIG. 15 is a cross-sectional end view of the rear frame structure of the motorcycle of FIG. 1.

The rear carrier 140 includes parallel members extending rearwardly. These members are associated by a cross bar 146 joined as can be seen in FIG. 15 by fasteners 148.

Figure 16:
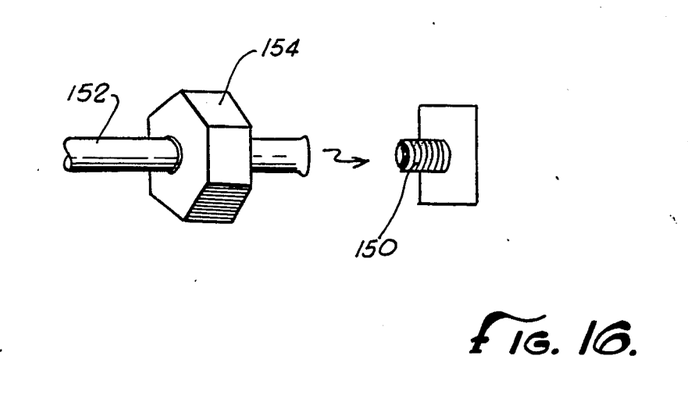
FIG. 16 illustrates a typical lubricant supply line joint employed with the present invention.

In FIG. 16, a coupling for a tube is illustrated. The coupling includes a hollow nipple 150 against which the tubing 152 is positioned. A nut 154 then draws the tubing 152 which is flanged at its end tightly on the nipple 150 for communication of lubricant therethrough.

Accordingly, an improved frame structure incorporating a lubricant reservoir system has been disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A frame for a motorcycle having a front fork suspension and an internal combustion engine with a lubricant supply system, comprising an oversized down tube assembly sealed to form a fluid tight cavity to provide engine lubricant storage and engine lubricant cooling and including two parallel, mutually spaced down tubes of rectangular cross section spaced apart laterally from the centerplane of the motorcycle wider than the front fork suspension, said down tubes being located to receive air flow during movement of the motorcycle to cool said lubricant passing through said down tube assembly, cross members connecting said parallel down tubes and forming part of said cavity;

a breather port in said down tube assembly and in communication with the lubricant supply system;

an inlet passage means to said cavity from the lubricant supply system of said engine; and an outlet passage means from said cavity to the lubricant supply system of said engine.

* * * * *